INVENTOR
FRANK W. WELLS.
BY James M. Abbott
ATTY.

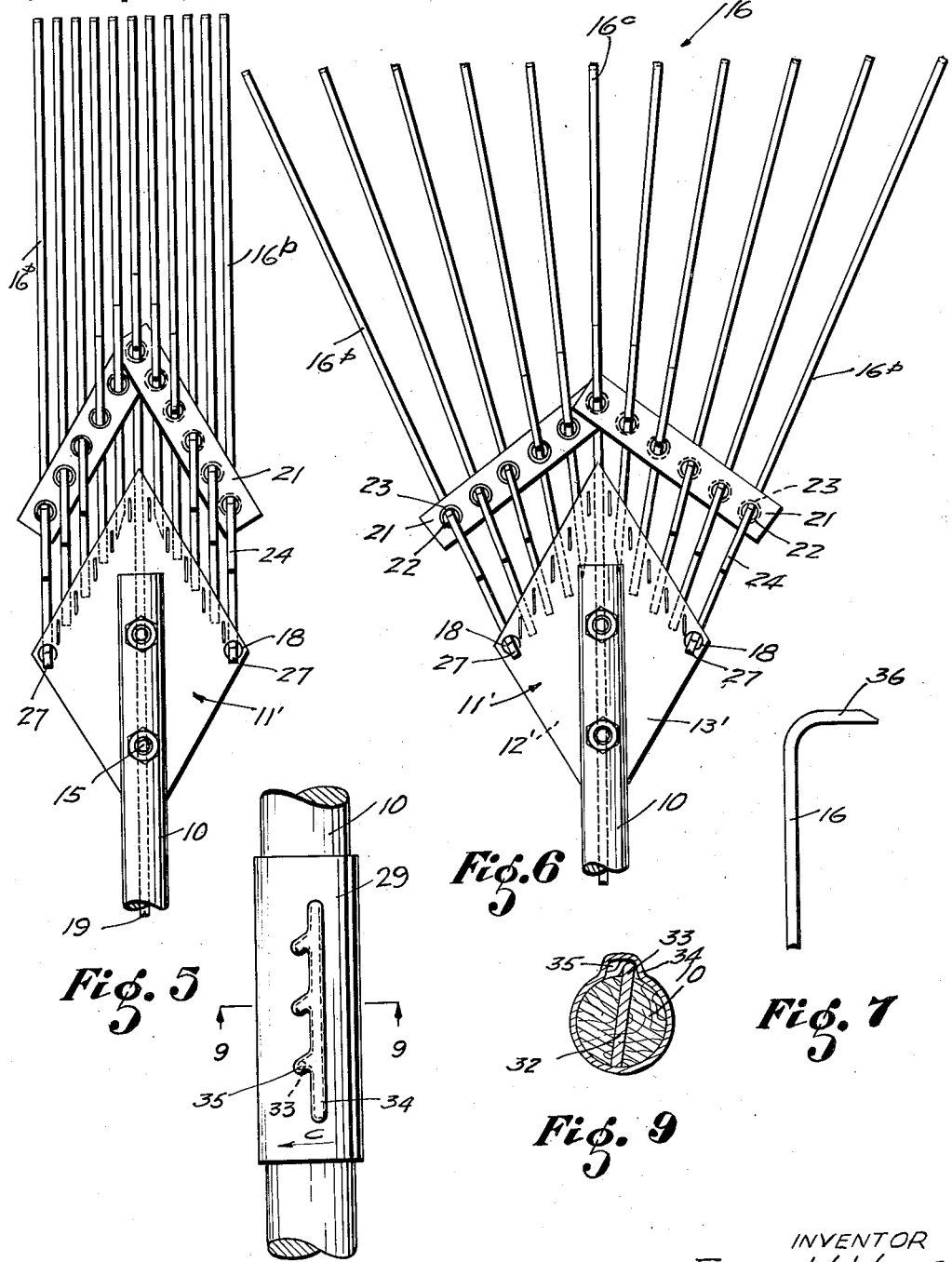

Patented Dec. 5, 1950

2,532,526

UNITED STATES PATENT OFFICE 2,532,526

ADJUSTABLE HAND RAKE

Frank W. Wells, Pasadena, Calif.

Application September 5, 1947, Serial No. 772,318

7 Claims. (Cl. 56—400.18)

This invention relates to a garden tool, and particularly pertains to an adjustable hand rake.

In the use of a hand rake in gardening, it often occurs that the spread of the rake is greater than the space between shrubs and the like within which space the rake is to be used, and furthermore, it is often desirable to utilize the teeth of a rake in digging and scratching the soil to a greater depth than is contemplated when using a rake with spring teeth. Such objects may be accomplished by providing a rake having a plurality of tines which are carried by a head structure and which may be spread outwardly in fan shape when raking a wide area, or may be swung towards each other to reduce the effective width of the rake and to give it additional rigidity when operating in a relatively narrow area or when it is desired to dig deeply in the soil. Heretofore, rakes of this general type have been provided but in most instances they have been unsatisfactory due to the fact that when the tines are spread outwardly in fan fashion the tooth line of the rake is arcuate and convexed, so that the rake tends to dig along its center section while the opposite outer edges will be held out of contact with the ground. Furthermore, some rakes of this type do not hold the tines in rigid set position. In order to provide a satisfactory rake of this general character it is desirable to design a rake head which carries a plurality of rake tines, the structure being manipulated to swing the tines toward and away from each other while maintaining the tooth line of the tines in a substantially straight line. It is the principal object of the present invention, therefore, to provide a hand rake having a rigid handle and carrying a head at one end thereof, said head affording a mounting for a plurality of rake tines articulately associated with the head and with each other and capable of being moved laterally toward and away from each other in a manner to insure that the outer toothed ends of the tines will lie along a substantially straight line irrespective of the degree to which the tines are separated from each other.

The present invention contemplates the provision of a rigid rake handle carrying a rigid rake head at one end thereof, said head being designed to receive one end of a plurality of rake tines, the opposite ends of said tines being bent to form rake teeth, the head being fitted with means whereby the tines may have relative lateral movement with relation to each other and may move longitudinally in a manner to maintain the toothed ends of the tines in line, the structure also including aligning bars which may be manipulated to shift the tines while adjusting the effective width of the rake.

The invention is illustrated by way of example in the accompanying drawings in which:

Fig. 5 is a view in elevation showing another form of rake head with part of the handle broken away, said head being in a contracted position.

Fig. 6 is a view in elevation similar to Fig. 5 but showing the rake head in its spread position.

Fig. 7 is an enlarged fragmentary view in elevation showing the form of the rake tooth at the end of one of the rake tines.

Fig. 8 is an enlarged fragmentary view in elevation showing the operating sleeve and the latch means therefor.

Fig. 9 is an enlarged view in transverse section through the handle and operating sleeve as seen on the line 9—9 of Fig. 8.

Figures 1, 2, 3, 4:
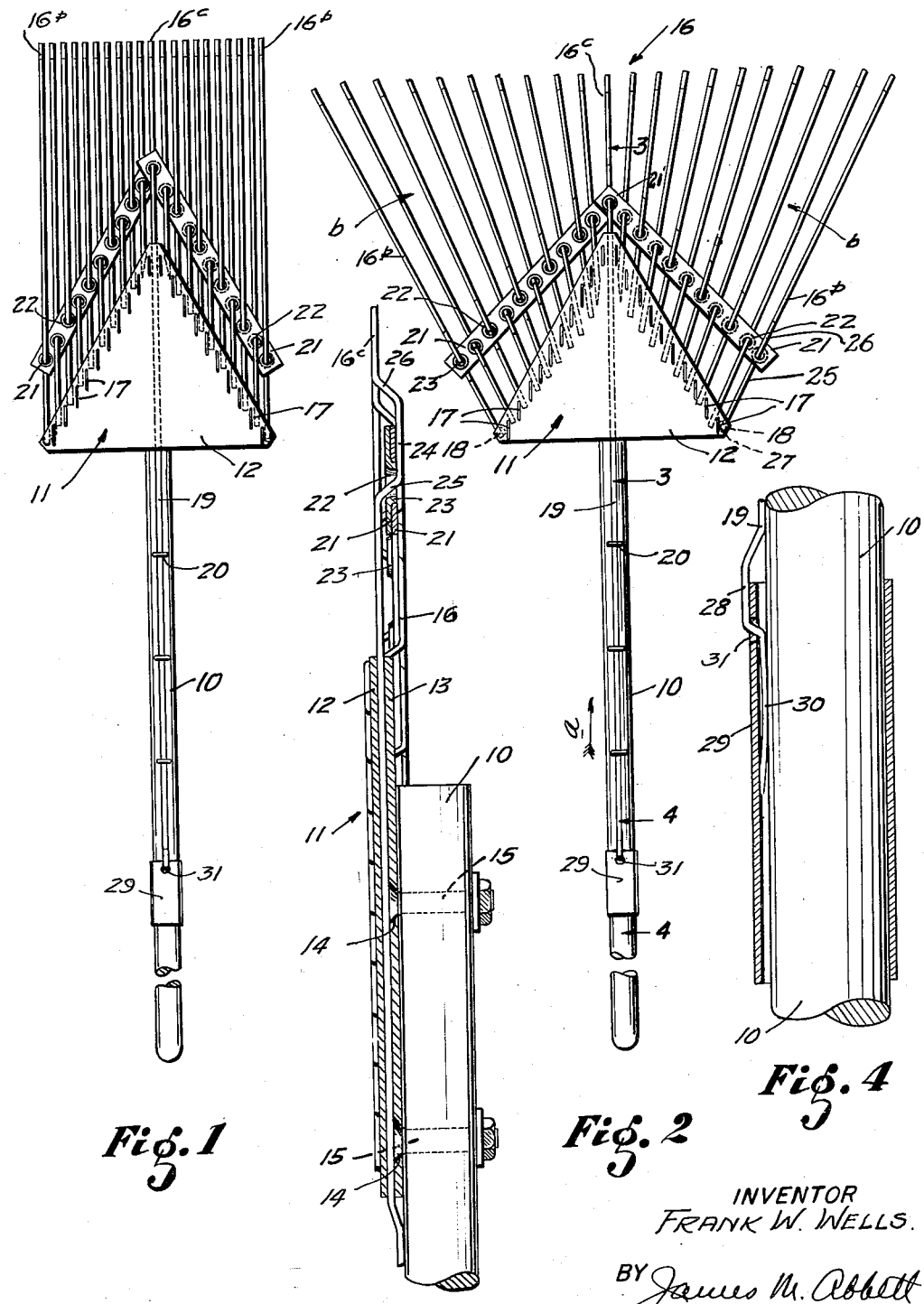
Figure 1 is a view in elevation showing one form of the rake with which the present invention is concerned and indicating the tines in their contracted relationship.
Fig. 2 is a view similar to Fig. 1 showing the rake with the tines spread to increase the relative width of the rake.
Fig. 3 is an enlarged view in longitudinal section and elevation as seen on the line 3—3 of Fig. 2 and shows the construction of the rake head and the manner in which the center tine and operating bar are mounted.
Fig. 4 is an enlarged fragmentary view showing the operating sleeve on the handle and indicating the connection for the operating bar and the manner in which the sleeve is tensioned.

Referring more particularly to Figs. 1 and 2 of the drawings, 10 indicates a rigid rake handle, of one end of which a rake head 11 is mounted. The base portion of the head comprises a pair of plates 12 and 13 which are shown as being substantially in the shape of equilateral triangles. The plate 13 rests directly against the face of the handle 10 and is formed with perforations 14 through which bolts 15 may extend to secure the plate to the handle. The plates 12 and 13 are spaced from each other a distance substantially representing the thickness of rake tines 16, the ends of which are disposed between the plates. The plates are held together by a series of staples 17 which are driven through the cold plate steel and are clinched. These staples are here shown as being disposed parallel to each other adjacent to the opposite inclined edges of the plates and are spaced a distance from each other to permit relative swinging movement of the tines 16 without producing a binding action between the tines as they operate. At the outer corners of the plate 13 are perforations 18, one of which is disposed at each corner to accommodate pivoted tines 16ᵖ. Attention is directed to the fact that the tines 16ᵖ are the only tines which are mounted upon the head 11 upon fixed pivots. Extending directly between the plates 12 and 13 along the longitudinal center line of the rake is an operating bar 19 which lies flat on the upper face of the handle 10 and is guided by staples 20 through which it extends and by which it may be directed in longitudinal movement. The end portion of the member 19 which extends beyond the apex of the head 10 terminates in a tine 16ᶜ which is the center tine of the rake. The tine 16ᶜ and the operating bar 19 move longitudinally and in no other direction. The tines 16 which are intermediate the center tine 16ᶜ and the pivoted tines 16ᵖ are designed to swing laterally and to move longitudinally as controlled by the cooperative action of the tines 16ᶜ and 16ᵖ. This action is brought about by actuating bars 21 which are formed with a plurality of perforations 22. A row of these perforations extends the length of each of the bars. The perforations are each circumscribed by a protruding lip 23. The bars 21 are made in duplicate. However, the protruding lips on the two bars are reversed for the purpose of assembly, which will be hereinafter explained.

The actuating bars 21 are disposed with their innermost ends 21' overlapping on the longitudinal center line of the rake. This places the innermost end perforations 22 in register so that the tine 16ᶜ may pass through the two perforations and thus act to pivotally connect the two actuating bars 21. The tine 16ᶜ has an offset portion 24 which is produced by a bend 25 designed to extend through the overlapping perforations 22 of the actuating bars 21, and a reverse bend 26 at the opposite end of the offset length 24 which occurs beyond the actuating bars. By reference to Fig. 3 of the drawing, it will be seen that the operating bar 19 and the main length of the tine 16ᶜ lie in a common plane, and that the offset portion 24 lies in a plane parallel thereto. The distance between the two planes represents the thickness of the actuating bar and its lips. The outer pivoted tines 16ᵖ are formed at one end with a bend portion 27 which extends outwardly through one of the perforations 18 in the plate 13. This bend is formed at the inner end of the tine 16ᵖ. Each of the tines of the rake are formed with offset portions 24, as previously described. The offset portion 24 of the tine 16ᵖ permits the bend 26 to pass through the perforation 22 at the end of each of the actuating bars 21, after which the main length of the tine extends forwardly in the plane of the rake head which is occupied by all of the tines. Attention is directed to the fact that the offset portions of the tines are arranged so that the bends 25 and 26 on contiguous tines alternately extend through the perforations 22 of the actuating bars 21. This causes the tines to remain in a desired position with relation to the actuating bars, and also insures that when the actuating bars are adjusted angularly by the operating member 19 the bars will be shifted simultaneously and will at the same time positively move all of the tines toward or away from each other as defined by the angular geometrical arrangement of the actuating bars 21, the pivoted tines 16ᵖ, and the center tine 16ᶜ. The operating bar 19, which is a continuation of the center tine 16ᶜ, provides the necessary movement for the actuating bars 21. By reference to Fig. 4 of the drawings it will be seen that the operating bar 19 has an offset portion 28 which passes over the edge of a tubular operating sleeve 29. The operating sleeve 29 is mounted upon the handle 10 and can be moved longitudinally thereof. The portion 28 of the operating bar 19 is bent at its outer end to form an extension 30. The extension 30 passes through an opening 31 in the sleeve 29. This extension is flexed and formed with a permanent set so that it will create friction against the handle 30 and tend to hold it in any desired position longitudinally of the rake handle 10. In addition to the gripping action of the portion 30 the sleeve 29 may be set at different points in its longitudinal path of travel. This is accomplished by a lock pin 32 which extends transversely through the rake handle 10 and has a portion 33 projecting beyond the cylindrical surface of the handle. The extension 33 is designed to fit within a groove 34. This groove is formed longitudinally of the sleeve 29 and has a plurality of lateral grooves or slots 35 leading from one side thereof so that a locking structure will be provided which has the function of a multiple bayonet lock. The lateral slots 35 are inclined at an angle to the longitudinal groove 34 and are directed away from the head of the rake. Due to this arrangement the tension in the rake structure will act to hold the lock member 33 in a selected slot 35 since the tension of the rake structure is such as to tend to move the operating bar 19 longitudinally of the rake handle 10 and away from the rake head 13. It is to be understood that since the wall of the sleeve 29 is protruded to form the longitudinal groove 30 and the lateral grooves or slots 35 these grooves will be covered by the wall so that the lock member 33 will not encounter the hand of the operator when the sleeve 29 is grasped.

In the drawings two forms of the present invention are disclosed. One form, as shown in Figs. 1 and 2 of the drawing, has a head structure 11 formed by two plates 12 and 13 which are triangular in shape. The other form is shown in Figs. 5 and 6 of the drawing, where a head structure 11' is provided and is made of plates 12' and 13'. These plates are substantially diamond-shaped. Due to the geometrical arrangement of the plates shown in the head 11' in which the angle between the sides of the plates is less than in Figs. 1 and 3 it is possible to cause the tines to be drawn closer together when they are in parallel relation since the transverse spacing of the attached inner ends of the tines is less than that in Figs. 1 and 3. This makes it possible for the rigidity of the rake to be increased so that the raking teeth at the end of the tines can be used in earth-working operations. It is preferable that the tines on the head 11' shall be of heavier gauge material than the tines on the head of the rake 11, and that the ends of these tines shall be curved at right angles to form a rigid tooth or blade 36. It will be evident from examining Fig. 5 of the drawing that when the type of tine is used as shown in Fig. 7, the collective action of the tine blades 36 will be substantially the same as that of a hoe.

In assembling the rakes of the type of which the present invention is concerned, the plates 12 and 13, or 12' and 13', are made, and are formed with perforations 18 at their corners to receive the bent end portions 27 of the tines 16ᵖ. The various tines 16, 16ᶜ and 16ᵖ are assembled with the actuating bars 21 and 22 and placed in a jig so that they will be properly held between the plates 12 and 13, or 12' and 13'. A stapling machine will then drive cold steel staples through the two plates of the head and at equal spaced intervals along the edges between which the tines project. These staples are indicated at 17 in the drawings and are parallel to each other. It will be seen that they provide a space between contiguous staples into which the inner ends of the tines 16 and 16c may project. This makes it possible for the tines to have longitudinal movement as well as pivotal action with relation to each other and the head while the tines are being moved to their spread or contracted positions. Prior to the time the staples 17 are driven through the plates and clenched the bolts 15 are placed in position so that the structure may be fastened to the handle 10. When the staples are driven through the plates and clenched it is intended that the operating bar 19, which is a continuation of the tine 16c, shall extend entirely between the plates of the head so that it may project along the side of the rake handle 10 and can be positioned slidably by the staples 17. It will be understood that the sleeve 29 will be articulately mounted at the outer end of the operating bar 19 so that it will be properly positioned upon the rake handle 10 with relation to the lock pin 32. When the rake is thus assembled the operating sleeve 29 may be moved along the sleeve and toward the rake head, and in so doing will move the operating bar 19 in the direction of the arrow a, as shown in Fig. 2 of the drawing. The bend portion 25 of the tine 16c will thus pull the ends of the actuating bars 21 in the same direction, and this movement will cause the opposite ends of the actuating bars 21 to swing the outer tines 16p in the direction of the arrows b, as indicated in Fig. 2 of the drawing. Since these tines are pivoted by means of the perforations 18 and the bend portions 27, which are formed at the ends of the tines 16p and extend into the perforations, the tines 16p must swing around fixed pivots. At this same time the tines 16 will be articulately disposed at their inner ends between the plates of the rake head and will be free to move longitudinally and to swing as determined by the actuating bars 21. When the operating bar 19 has been moved outwardly to the limit of its stroke the various tines of the rake head will have been swung inwardly from the position shown in Fig. 2 to the position shown in Fig. 1. It will be noted that at this time the opposite angular edges of the rake head 11 and the actuating bars 21 are in substantially parallel spaced relation to each other. When the sleeve 29 is moved in a counter-direction from that indicated by the arrow a in Fig. 2 the inner ends of the actuating bars 21 will be drawn toward the apex of the rake head and this will cause the actuating bars 21 to shift longitudinally as controlled by the pivoted tines 16p. The intermediate tines 16 will adapt themselves in proper angular relation to each other as well as with the center tine 16c and the pivoted tines 16p. Thus the tines will be spread apart a desired distance. When the tines are adjusted the sleeve 29 is rotated in the direction of the arrow c, as shown in Fig. 8 of the drawings. This movement is attained by flexing the operating rod 19 and will at the same time move the locking element 33 along one of the lateral slots 35 and into the longitudinal groove 34. The sleeve 29 may then be moved longitudinally as desired, and when released will exert tension tending to rotate the sleeve in a counter-direction to the arrow c, and tending to hold the locking element 33 in the bottom of one of the lateral grooves 35.

The operation of the structure shown in Figs. 6 and 7 is brought about in the manner previously described.

It should be pointed out that since the pivotal points of the tines 16p are fixed pivots and are in fixed spaced relation to the outer ends of the actuating bars 21 the bars 21 will be held rigidly when the sleeve 29 is disposed in a desired set position. Furthermore, since each of the tines 16 has a fixed point of pivot with the actuating bars 21 these tines will remain in uniform spaced relation to each other irrespective of the angular adjustment of the actuating bars with relation to the edges of the rake head. This structure not only causes the tines 16 to assume desired spaced relationship but also insures that the tines will be held in an angular set position without possibility of moving toward and away from each other when the sleeve 29 is set.

It should also be pointed out that due to the bodily movement of the tines together with their pivotal movement the ends of the tines will be disposed upon a substantially straight line normal to the longitudinal axis of the rake handle irrespective of the degree of angular adjustment of the tines with relation to each other.

It will thus be seen that the rake structure here disclosed is simple and inexpensive in construction, may be easily assembled without the use of accurate and complicated machinery, and that the rake may be easily manipulated to dispose the tines of the rake at a desired spread and to hold them in that position with the toothed ends of the tines disposed along a substantially straight operating line.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. An adjustable rake comprising a handle, a rigid head fixed at one end of the handle and symmetrically disposed with relation to the longitudinal axis of the handle, a pair of actuating bars pivotally connected together at their inner ends and extending oppositely along the end face of the rake head, said pivotal connection being at a point along the longitudinal center plane of the rake handle, means articulately connecting the opposite outer ends of the actuating bars to the rake head adjacent its opposite ends whereby said ends of the actuating bars will be held in spaced relation to the ends of the rake head permitting the actuating bars to move in the plane of the rake head, an operating bar associated with the pivotal connection between the actuating bars and being held for longitudinal reciprocating movement relative to the rake head and its handle, a plurality of rake tines pivotally connected to the actuating bars at points spaced equally throughout the length of the actuating bars and at points intermediate the length of the tines, and individual articulate connections between the inner ends of said tines and the outer edge of the rake head and at spaced intervals throughout the length of the rake head whereby longitudinal movement of the operating bar when varying the angular relationship of the actuating bars with the rake head will cause the tines to move bodily with relation to each other in assuming a contracted or spread position and while the working ends of the tines are at all times maintained in a plane normal to the longitudinal axis of the handle.

2. An adjustable rake comprising a handle, a rigid rake head formed with two forward angular edges symmetrically arranged at opposite sides of the longitudinal center of the rake, an operating bar mounted to reciprocate longitudinally of the rake handle and the head, a pair of oppositely extending actuating bars pivotally associated with each other at their inner ends and pivotally associated with the operating bar, said bars lying in the plane of the rake head, pivotal connections between the outer ends of said actuating bars and the outer ends of the angular faces of the rake head whereby the outer ends of the actuating bars may be held in spaced pivotal relation to the rake head and may be free to swing in the plane of the rake head as limited by said pivotal connections, a plurality of rake tines pivotally secured to the actuating bars in equal spaced relation to each other along said bars and at points intermediate the ends of the tines, and a plurality of equally spaced guide members carried by the rake head and between which the inner ends of said tines extend for swinging and longitudinal movement whereby when the operating bar is moved longitudinally of the rake handle and the angular relation of the actuating bars is changed with relation to the forward edges of the rake head the tines will be moved toward and away from each other while the working ends of the tines will be maintained in a substantially straight line normal to the longitudinal axis of the rake handle.

3. An adjustable rake comprising a handle, a rigid head structure secured at one end thereof, the forward edge of said head structure defining an equilateral triangle, the altitude of which is coincident to the longitudinal axis of the rake handle, an operating bar disposed longitudinally of said handle and centrally of the rake head, means for holding said operating bar with relation to the rake handle whereby the bar may reciprocate longitudinally thereof, a rake center tine formed as a continuation of the operating bar and extending forwardly of the apex of the rake head, a pair of actuating bars, the inner ends of which are pivotally connected with the operating bar at a point in spaced relation to the apex of the rake head and in substantially the plane thereof, the length of said actuating bars extending along and in spaced relation to the triangular sides of the rake head, pivotal connections between the rake head at substantially the outer ends of its triangular sides and free ends of the actuating bars whereby the free ends of the actuating bars will move in the plane of the rake head as the pivoted ends of the actuating bars are moved back and forth by the operating member, a rake tine carried by each of said pivotal means and extending forwardly of the actuating bars in the same plane with the center tine, a plurality of rake tines interposed between the center tine and each of the pivoted tines, a pivotal connection between each of said tines and the actuating bars in fixed spaced relation to each other and at points intermediate the ends of the tines, and guide means equally spaced along the forward edges of said rake head to receive the inner ends of said pivoted tines whereby relative movement of the actuating bars with relation to the edges of the rake head will cause the said inner tine ends to move with relation to the guide means as the tines bodily shift and rotate upon their pivotal axis whereby the working ends of the tines will be maintained in a straight plane normal to the longitudinal axis of the handle.

4. An adjustable rake comprising a handle, a head attached to one end of the handle formed by two flat plates secured in spaced relation to each other, a plurality of tines disposed between said plates and lying in a common plane, pivotal connections between the outermost tines and the head whereby said tines may swing in said common plane, a guide means carried centrally of the rake head for receiving a center tine whereby said tine may reciprocate along the longitudinal axis of the rake handle, an operating bar slidably mounted upon the rake handle and at the end of which said center tine is formed, a plurality of guide and spacing means on the head intermediate the pivoted tines and the reciprocating tine for receiving the inner ends of intermediate tines whereby said tines may swing in the common plane of the rake and may move longitudinally, and a pair of actuating bars pivotally connected to each other and the center tine at their inner ends and pivotally connected to the pivoted tines at their outer ends, the said intermediate tines being pivotally connected to the actuating bars at uniform spaced relation to each other between the center and the pivoted tines, whereby reciprocation of the operating bar and the center tine will simultaneously move all of the tines and cause them to assume equal spaced relation to each other while maintaining the working ends of the tines in a substantially straight line normal to the longitudinal axis of the rake handle.

5. The structure of claim 4 including a grip mounted upon the rake handle and connected to the operating bar whereby the bar may be reciprocated relative to the handle.

6. The structure of claim 4 including a grip mounted upon the rake handle and connected to the operating bar whereby the bar may be reciprocated relative to the handle, and friction means acting between the grip and the rake handle to temporarily hold the grip in a set position.

7. The structure of claim 4 including a grip mounted upon the rake handle and connected to the operating bar whereby the bar may be reciprocated relative to the handle, and cooperating means between the grip and the handle whereby the grip may be temporarily set in desired adjusted positions along the handle.

FRANK W. WELLS.

REFERENCES CITED

The following references are of record in the file of this patent:

UNITED STATES PATENTS

| Number | Name | Date |
| --- | --- | --- |
| 999,930 | Weisel | Aug. 8, 1911 |
| 1,149,098 | Tanaka | Aug. 3, 1915 |
| 1,272,567 | Swan | July 16, 1918 |
| 1,372,558 | Saxl | Mar. 22, 1921 |
| 1,904,843 | Withington | Apr. 18, 1933 |
| 1,916,052 | Jenkins | June 27, 1933 |
| 2,086,170 | Muranaka | July 6, 1937 |
| 2,163,421 | Caramanico | June 20, 1939 |
| 2,222,163 | Austin | Nov. 19, 1940 |